Patented Aug. 26, 1930

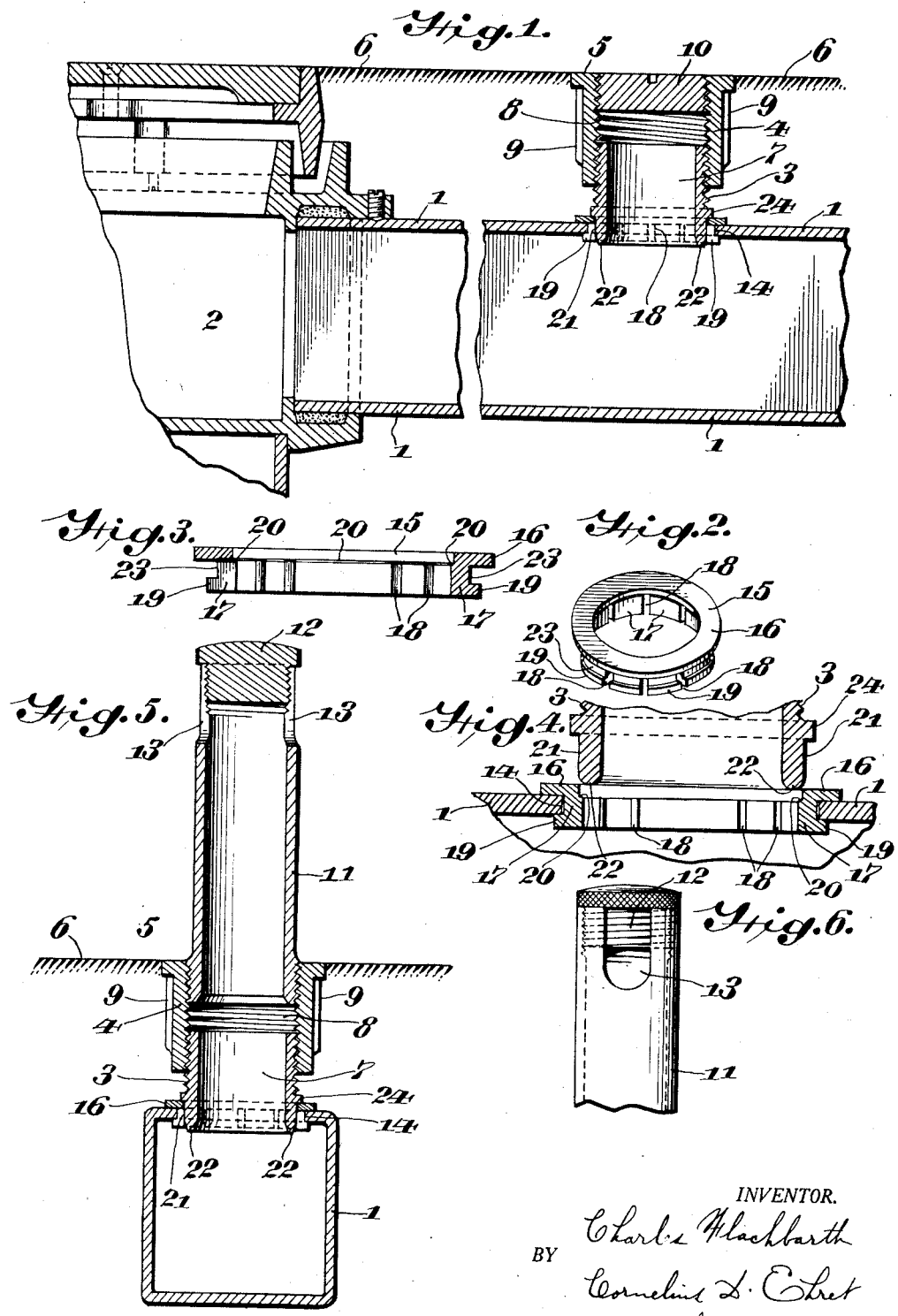

1,773,811

UNITED STATES PATENT OFFICE

CHARLES FLACHBARTH, OF PHILADELPHIA, PENNSYLVANIA, ASSIGNOR TO WALKER BROTHERS, OF PHILADELPHIA, PENNSYLVANIA, A CORPORATION OF PENNSYLVANIA

UNDERFLOOR-CONDUIT OUTLET COUPLING

Application filed January 31, 1925. Serial No. 5,938.

This invention relates to wiring systems, such as are now commonly installed in the walls or partitions of buildings of modern construction, and more particularly in the floors of buildings, such as office buildings. In an office building, in which a large number of outlets for wires for different services must be provided, it is the general practice to place the wiring conduits in the floors prior to their completion and to provide fittings in the conduit leading to the floor surface at the points where outlets are required. The conduits may be installed at different distances beneath the floor surface and, as the fitting should terminate flush with the finished floor surface, it is desirable to employ a fitting which is capable of adjustment as to length. Also, since the conduit ordinarily used is of thin steel, the fitting must include means by which it can be securely mounted in position in the conduit wall without the necessity of cutting threads in the latter. The threading of an aperture in a thin-wall wiring conduit is not only a difficult operation, but the chips or fine particles of metal dropping into the conduit may cause damage to the insulation of the wires.

The present invention is directed to the provision of an outlet fitting to be used with concealed wiring systems, which is readily installed in the conduit and which is capable of adjustment as to over-all length in accordance with the conditions of installation. The fitting includes a tubular coupling member which has an expansible mounting in the conduit wall and a tubular terminal member or standpipe support which is mounted on the coupling member and terminates flush with the finished floor surface. The coupling member, if desired, may be made in two parts, one of which is in the form of an expansible ferrule which is to be placed in an opening in the conduit wall. The main member of the coupling is then inserted in this ferrule and by its insertion, expands the latter so that the ferrule tightly grips the edges of the conduit around the aperture and likewise tightly holds the main coupling member. The standpipe support is threaded on the end of the coupling member and is also provided with an opening in which a standpipe or a cap may be inserted. The coupling member and the standpipe support have registering bores through which the wires may be led from the conduit, and the lower end of the coupling member mounted in the conduit is smoothly finished and projects into the conduit so as to provide a smooth surface over which the wires pass. Since the fitting is capable of adjustment as to over-all length, a single form of fitting may be used throughout a wiring system, even though the conduits vary in position with relation to the finished floor surface to a substantial extent.

For a better understanding of the invention, reference may be had to the accompanying drawings—

Fig. 1 is a vertical sectional view of structure embodying my invention.

Fig. 2 is a perspective view of the ferrule.

Fig. 3 is a cross sectional view of the ferrule.

Fig. 4 is a fragmentally sectional view.

Fig. 5 is a vertical sectional view of a modification.

Fig. 6 is a fragmentally and elevational view of a portion of Fig. 5.

Referring to the drawing, 1 is a conduit, preferably rectangular in cross section or having a substantially flat upper surface, and composed of metal such as steel or other suitable material. It is disposed in a floor, of concrete or other material, and communicates with the floor box 2 in which connection is made between the conductors in the conduit 1 and conductors disposed in conduits communicating with the box 2.

The conduit 1 ordinarily lies beneath and substantially parallel to the finished floor surface and is placed in position before the floor is completed, usually being mounted on suitable supports on the rough floor slab before the finishing layer has been put in position. At the different points where outlets are required, an opening is made in the upper wall of the conduit and an outlet fitting is inserted in this opening.

This outlet fitting comprises the coupling member 3 upon which is carried the second member 4 adjustable on the member 3 to bring the outer or remote end 5 of the member 4 flush with or in predetermined position with respect to the surface 6 of the floor or wall, generally in advance of the completion of the floor or wall. The terminal member or standpipe support 4 is capable of adjustment on the coupling member without affecting the mounting of the coupling member in the wall of the duct.

The members 3 and 4 have the registering bores 7 and 8 communicating with the interior of the conduit 1 and through which the conductors extend to any instrument or device above or upon the wall or floor.

The member 4 is preferably threaded upon the member 3 for effecting adjustment of the remote end 5 to the predetermined position; and any suitable means, as ribs 9, are provided to prevent rotation of the member 4 after application there about of the floor material. Threaded into the member 4 is the plug 10 whose upper surface may be brought flush with the end 5. Or, as indicated in Fig. 5, there may be threaded into the member 4 the standpipe 11 having the closure plug 12 and provided with the conductor outlet openings 13, 13.

Through the wall of the conduit 1, preferably in its substantially flat wall or surface, is drilled a hole 14 at a point longitudinally of the conduit 1 where it is desired to bring out conductors through the floor or wall. The hole 14 is drilled and the outlet or coupling structure applied preferably before the floor is laid, or in any event before the uppermost portion thereof is laid or finished.

Through the hole 14 is inserted the small end of the ferrule 15 having the upper flange 16 integral with which are the downwardly extending segmental portions or fingers 17 formed by the several slot 18. The fingers 17 have the relatively shorter outwardly extending flange members 19 between which and the flange 16 is received the flat wall of the conduit 1.

At suitable distance below the upper face of the flange 16 the bore of the ferrule is diminished, forming the shoulders 20 on the fingers 17.

The lower portion of the member 3 has the cylindrical surface 21 of an outer diameter substantially equal to the internal diameter of the ferrule above the shoulders 20, and terminating at the rounded end 22.

The ferrule 15 may be expanded in the hole 14 by driving downwardly therethrough a tool having a cylindrical surface corresponding with the surface 21 of the member 3 and preferably terminating in a rounded end corresponding with the rounded end 22.

Or the member 3 may itself be driven downwardly from the position indicated in Fig. 4 to the position indicated in Figs. 1 and 5, the lower end of the member 3 engaging the shoulders 20, forcing the fingers 17 outwardly as the cylindrical surface 21 descends, causing the cylindrical surface 23 of the ferrule between the flanges 16 and 19 to engage the edge of the hole 14 and causing the flanges 16 and 17 to frictionally engage the outer and inner surfaces of the wall of the conduit 1. By so driving the member 3 into the ferrule, it brings the ferrule into tight locking engagement with the conduit, and causes firm frictional engagement of the surface 21 with the inside surfaces of the ferrule, thereby holding member 3 rigidly to the conduit 1. The member 3 may be provided with the flange 24 at the upper end of the surface 21 for engaging upon the upper face of the flange 16 and limiting the distance to which the member 3 may be inserted into the ferrule 15.

After so affixing the member 3 to the conduit 1, and after adjustment of the member 4 to suitable position upon the member 3, the floor material or at least the last portion thereof may be laid or placed in position over and around the conduit 1 and around the coupling structure of which the member 4 is held against rotation by the floor material engaged by the ribs 9.

An important advantage of my structure resides in the fact that the conduit need not be tapped or threaded for receiving and holding the coupling member or element, as 3, and therefore no metal chips or pieces severed from the conduit by a tap or threading instrument can find their way into the conduit contrary to good practice and requirements of the fire underwriters. It will be seen that the coupling member 3 has a frictional or expansible mounting in the wall of the conduit and by the method of its insertion is firmly held in position. The coupling member carries the standpipe support which may be adjusted lengthwise of the coupling member without affecting the mounting of the latter, and by suitably proportioning the parts the overall length of the fitting may be varied within selected limits, dependent on the conditions of installation. The standpipe support is ordinarily adjusted so that its upper surface lies flush with the finished floor surface and its presence in the floor is therefore not objectionable.

What I claim is:

1. In an underfloor wiring system, the combination of a wiring conduit lying embedded in the floor and having an aperture in its upper wall, an expansible ferrule mounted in the conduit in said aperture, and a tubular member detachably supported in the ferrule by having one end frictionally held therein, the said end projecting into the conduit beyond the ferrule, the said end being of less outer diameter than the aperture.

2. In an underfloor wiring system, the combination of a wiring conduit embedded in the floor and having a smooth-walled aperture in its upper surface, a tubular member having one end entering the conduit through the aperture, the said end lying within the conduit, and means for holding said end of the tubular member against withdrawal, said means having a part with a smooth outer wall lying in said aperture and another part of greater diameter than the aperture engaging the inner surface of the conduit wall adjacent said aperture, said end of the tubular member lying within said conduit beyond said means and having a smooth rounded edge providing a contacting surface for wiring led from the conduit and out through said tubular member.

3. In an underfloor duct system, the combination of a wire conduit embedded in the floor and having an aperture in its upper surface, a tubular member having one end entering the conduit through the aperture and lying within the conduit, and expansible means for holding said end of the tubular member against withdrawal, said means including a portion of greater diameter than the aperture lying within the conduit and engaging the inner surface of the conduit wall adjacent said aperture, said end of the tubular member within said conduit having a smooth rounded edge.

CHARLES FLACHBARTH.